United States Patent Office 3,282,792
Patented Nov. 1, 1966

3,282,792
STABILIZED STANNOUS FLUORIDE DENTIFRICE
COMPOSITIONS
Anthony J. Fiscella, Redbank, N.J., assignor to Bristol-Myers Company, New York, N.Y., a corporation of Delaware
No Drawing. Filed Jan. 9, 1964, Ser. No. 336,644
12 Claims. (Cl. 167—93)

This application is a continuation-in-part of my prior application, Serial No. 136,441, filed September 7, 1961, now abandoned.

This invention relates to aqueous compositions including mouth washes and dentifrices containing stannous fluoride, with said stannous fluoride being maintained in soluble and stable form.

The generally accepted theory is that dental caries result at least partially from the acids formed by microorganisms in the mouth in the course of their metabolism. Such acids, when in contact with the teeth, attack the enamel of the teeth, dissolving the enamel and resulting in tooth decay. A great deal of research effort has been devoted to finding methods and means for protecting teeth against the attack of such acids. Those skilled in the dentifrice art are familiar with the numerous proposals advanced to overcome the problem. One proposal has been the use of stannous salts, such as stannous fluoride, as the active ingredient in a dentifrice as a means of retarding caries. The stannous fluoride has been included in dentifrices, mouth washes, and also in topical solutions intended for direct application to the teeth by dentists. However, the stannous fluoride has been found to precipitate from its aqueous solutions after relatively short periods, in the form of stannous oxyfluoride, which is inactive, thereby reducing the potency. Stannous fluoride has less of a tendency to precipitate from its aqueous solutions as stannous oxyfluoride if the pH is reduced to about 2.5 or below. This low pH is unacceptable for dental and oral use. Unless the low pH is observed, the shelf life of stannous-containing compositions has been unsatisfactory. Also, the stannous ion, the active form, has been found to tend to be oxidized to the ineffective stannic form on standing for extended periods.

It is an object of this invention to provide stable aqueous compositions comprising stannous fluoride.

It is another object of the present invention to provide a mouth wash or dentifrice comprising a stable composition in which the stannous salt, such as stannous fluoride, is maintained in soluble, fully active form.

Other objects will be apparent to those skilled in the art from reading the description that follows.

The objects of the invention are achieved by introducing into aqueous stannous fluoride-containing compositions, such as mouth washes and dentifrices, small amounts of a hydroxyl substituted carboxylic acid selected from the class consisting of hydroxyl substituted aliphatic di- and tri-carboxylic acids and water-soluble salts thereof. The preferred acids for use in the invention are citric, tartaric, malic and tartronic acids and their water-soluble salts. Such salts as the alkali-metal salts, such as the sodium and potassium, and the ammonium and the amine salts are preferred.

It has been found that the presence of the hydroxyl substituted aliphatic di- and tri-carboxylic acids, or a water-soluble salt thereof, is effective to prevent the precipitation of the stannous ion and consequent loss of fluoride ion from solution and to stabilize the tin in the stannous, or other than stannic, form while it is in the solution. The addition of one of these acids or a water-soluble salt thereof has been found to prevent the hydrolysis of the stannous fluoride to stannous oxyfluoride, the latter being insoluble and inactive. A further beneficial effect of the addition of at least one of these acids or their water-soluble salts has been found to be the prevention of an off-odor which is characteristically produced by Irish moss which is sometimes employed in dentifrices containing soluble stannous compounds.

The effect of the hydroxyl substituted aliphatic di- and tri-carboxylic acids and their water-soluble salts in preventing the precipitation and oxidation of the stannous ion was unexpected. Compounds having characteristics similar to these acids have been found to be ineffective for such purposes. For instance, chelating and complexing agents, such as ethylene diamine tetra-acetic acid (known as EDTA and Versene), have been found to be ineffective. Yet the acids of the invention and their water-soluble salts effectively chelate or form a complex with the stannous ion which releases stannous ion in effective form in the mouth of the user.

The acids of the invention may be present in the form of the free acid or in the form of water soluble salts of nontoxic metals, preferably alkali-metal salts, such as the sodium or potassium salts; the sodium salt being the preferred species. They may also be present as the ammonium or amine salts, for instance, dimethylamine or ammonium citrate, tartrate, malate or tartronate.

The stannous fluoride salt may be introduced per se or in the form of other stannous salts and water-soluble fluorides which will react in solution to form stannous fluoride. Thus one may employ lithium or sodium fluorides with stannous chloride or sulfate providing the source of stannous ions. Desirably, but not necessarily, the stannous and fluoride ions are present in 1-to-2 equivalent amounts.

Desirably, the hydroxyl substituted aliphatic di- or tri-carboxylic acid or water-soluble salt thereof are present in 5% to 50% of molar excess of the amount of stannous fluoride. Preferably, there would be present a 5% molar excess.

The compositions are aqueous, either solutions or suspensions in the case of paste dentifrices.

Aqueous formulations of the invention, containing an ion of the hydroxyl substituted aliphatic di- and tri-carboxylic acids, can be prepared at various pH's. The pH does not become important to the stability and solubility of the stannous fluoride as it does in the absence of these ions. Thus, a formulation may have a pH as high as 7, and the stannous fluoride will not precipitate. However, it is desirable to maintain the pH at reasonably low levels where the fluoride ion is most effective. The preferred pH range is from 3 to 7.

The concentrations of the di- and tri-carboxylic acids of the invention and salts thereof are desirably between about 0.05% to 10% by weight of the composition. There is no criticality of concentrations in this range. For dentifrices, the concentration is preferably from about 0.1% to 5%, with 1 to 5% more desirable and with 2% most desirable. For mouth washes, 0.05 to 3% is desirable with 0.5% preferred. For dental topical solutions 5 to 10% is preferred.

The concentration of stannous fluoride varies with the use of the compound being formed but is desirably in the following ranges:

(1) Dentifrice—between about 0.1 and 2.0%, preferably about 0.4%
(2) Mouthwash—between about 0.01 and 0.2%, preferably about 0.04%
(3) Dentist's topical solution—between about 1 and 5%, desirably about 2%

Tests have been run to determine the stability of aqueous solutions containing a theoretical 0.50% by weight stannous fluoride and 2% by weight of sodium citrate and sodium tartrate of the invention with 2% by weight of sodium ethylenediamine tetraacetic acid. The results are shown below in Table I.

TABLE I

| Ingredient | Theoretical percent SnF$_2$ | Initial percent SnF$_2$ as determined by actual analysis | Initial pH | Percent SnF$_2$ by analysis after one week |
| --- | --- | --- | --- | --- |
| Na citrate | 0.50 | 0.42 | 4.5 | 0.40 |
| Na tartrate | 0.50 | 0.45 | 4.5 | 0.45 |
| Na salt of ethylenediamine tetra-acetic acid | 0.50 | 0.44 | 4.5 | 0.25 |

As is seen from the table, the citrate and tartrate of the invention have proved about equally effective in preventing precipitation of the stannous ion. The malate and tartonate ions are comparable to the citrate and tartrate in their ability to chelate or form complexes with metallic ions. The ethylenediamine tetraacetic acid solution formed a heavy precipitate in one week and analysis showed that the amount of available stannous fluoride had dropped to nearly one-half of the original in only one week. This result was in spite of the fact that ethylenediamine tetraacetic acid is a highly regarded chelating and complexing agent.

Where the caries preventing composition is a paste or powder dentifrice, it is desirable to incorporate into the dentifrice a solid polishing agent, such as dicalcium phosphate, calcium pyrophosphate, tricalcium phosphate or powdered chalk, (calcium carbonate), etc. In dentifrices utilizing the compounds of the invention, the formulation must utilize an abrasive that is compatible with the stannous ion. Also, the abrasive must not react with the hydroxyl substituted aliphatic di- or tri-carboxylic acid. If a calcium abrasive is used, it must be less water soluble than calcium fluoride where stannous fluoride is used as the stannuos salt. Calcium-free abrasives are preferred, such as micro-crystalline alumina, insoluble metaphosphates, calcined aluminum silicates and lactose in suspension. It is particularly preferable that the entire composition be substantially free from calcium ions. As used herein, a composition is considered to be substantially free from calcium ions when it contains less than 10 p.p.m. of calcium ion in solution. A dentifrice composition utilizing Kaopolite (calcined aluminum silicate) as the abrasive is the subject of my copending application with Everett L. Saul, Ser. No. 138,005, filed September 14, 1961, now U.S. Patent No. 3,105,013, granted September 24, 1963. The combination of an insoluble alkaline-metaphosphate with a water-soluble fluoride in a calcium-ion-free system is the subject of copending application Ser. No. 304,211, filed August 23, 1963, assigned to the same assignee as the present application.

In addition to the stannous fluoride and polishing agent (when desired), the dentifrices may contain as optional ingredients a soap or synthetic detergent as a surface tension depressant. Soaps of high molecular weight fatty acids, including, for example, sodium and potassium soaps of myristic, stearic and palmitic acids and the fatty acid mixtures of palm oil and coconut oil, as well as diglycol laurate, diglycol stearate and glycostearine, can be employed. Typical synthetic detergents include the alkyl sulfates and sulfonates having alkyl groups of from about 8 to about 18 carbon atoms, such as sodium lauryl sulfate, the sulfated fatty alcohols derived from coconut oil and palm oil, sodium cetyl sulfate, sulfated sperm oil fatty alcohols and sodium oleyl sulfate, salts of fatty acid amides of taurines (the Igepons), such as sodium palmitic methyl tauride, sulfated glycerides, such as oleyl, stearic, palmitic and ricinoleic glycerides, usually in the form of mixed glycerides and sulfonated hydrocarbons having from 8 to 20 carbon atoms, such as sulfonated decanes, dodecanes and octadecanes. Particularly good results are obtained with Tweens, such as Tween 20 which is the polyoxyethylene derivative of sorbitan monolaurate, Another type is the Brucals, such as sodium lauroyl isethionate.

Other optional conventional components of a dentifrice include flavoring materials, such as the flavoring oils (peppermint oil, etc.); sweeteners, such as saccharin and sodium cyclamate, and harmless coloring materials, in proportions to give any desired taste or flavor or other effect.

In a preferred embodiment of the invention, the dentifrice is in the form of a paste, and in this event it will contain a carrier and softener and a binder in amounts to give the dentifrice a smooth texture and good flowability. Glycerin and propylene glycol and sorbitol are preferred humectants, carriers and softeners, but other softeners known to those skilled in the art may be employed. As binders there can be used carboxymethylcellulose, gum tragacanth, sodium alginate, Irish moss, gum acacia, pectin, Kelcoloid-LD (propylene glycol ester of alginic acid), etc. Those skilled in the dentifrice art will know other carriers, softeners and binders. The pastes may be either of the aqueous type containing substantial amounts of water (above 18%) or of the substantially anhydrous type, containing less than 5% water. Formulations are given below for both types.

In addition to pastes the dentifrices of the invention may be in the form of powders or liquids. The main difference between a paste and powder is that the latter contains little or no water and usually no binder or softener. A liquid usually differs from a paste in that it is more fluid and contains no solid polishing agent.

The following are general formulations of tooth pastes, powders and liquids of the types contemplated according to the present invention (parts are expressed in terms of parts by weight):

AQUEOUS TOOTH PASTE

| | Parts by weight |
| --- | --- |
| Stannous fluoride | 0.1 to 2.0 |
| Hydroxyl substituted aliphatic di- or tricarboxylic acid or salt thereof | 0.1 to 5 |
| Water | 18 to 25 |
| Binder | 0.8 to 1.2 |
| Polishing agent | 40 to 50 |
| Softener or humectant | 20 to 25 |
| Detergent | 0 to 2 |
| Sweetener | 0.1 to 0.2 |
| Flavoring oils | 0.9 to 1.2 |

SUBSTANTIALLY ANHYDROUS TOOTH PASTE

| | Parts by weight |
| --- | --- |
| Stannous fluoride | 0.1 to 2.0 |
| Hydroxyl substituted aliphatic di- or tricarboxylic acid or salt thereof | 0.1 to 5 |
| Water | 0 to 4.5 |
| Binder | 0.3 to 1.2 |
| Polishing agent | 45 to 70 |
| Humectant | 25 to 45 |
| Detergent | 0 to 2 |
| Sweetener | 0.03 to 0.10 |
| Flavoring oils | 0.9 to 1.2 |

POWDER DENTIFRICE

| | Parts by weight |
| --- | --- |
| Stannous fluoride | 0.1 to 2.0 |
| Hydroxyl substituted aliphatic di- or tricarboxylic acid or salt thereof | 0.1 to 5 |
| Polishing agent | 93.6 to 98 |
| Detergent | 1 to 3 |
| Flavoring oils | 0.85 to 1.2 |
| Sweetener | 0.1 to 0.2 |

LIQUID DENTIFRICE

| Ingredient | Parts by weight |
|---|---|
| Stannous fluoride | 0.1 to 2.0 |
| Hydroxyl substituted aliphatic di- or tricarboxylic acid or salt thereof | 0.1 to 5 |
| Water | 60.1 to 92 |
| Detergent | 1.5 to 5 |
| Softener | 5 to 30 |
| Binder or suspending agent | 0.5 to 1.5 |
| Flavoring agent | 0.85 to 1.2 |
| Sweetener | 0.1 to 0.2 |

In order more clearly to disclose the nature of the present invention, specific examples illustrating the preparation of typical compositions will hereinafter be described. It should be understood, however, that this is done solely by way of example and is intended neither to delineate the scope of the invention nor limit the ambit of the appended claims. Unless otherwise stated, quantities of materials are referred to in terms of percent by weight. The materials are mixed together in accordance with the standard practices in the dentifrice art.

The following are typical dentifrice examples:

Example I

| Ingredient | Percent by weight |
|---|---|
| Sodium citrate | 2.00 |
| Stannous fluoride | 0.4 |
| Glycerine | 27.57 |
| Kaopolite-SF (calcined aluminum silicate) | 43.00 |
| Sodium lauryl sulfate | 1.70 |
| Kelcoloid-LD | 1.5 |
| Flavor | 1.0 |
| Sweetener | 0.2 |
| Water | 22.63 |
| | 100.00 |

Example II

| Ingredient | Percent by weight |
|---|---|
| Sodium citrate | 2.0 |
| Stannous fluoride | 0.4 |
| Glycerine | 27.57 |
| Kaopolite-SF (calcined aluminum silicate) | 29.00 |
| Sodium lauryl sulfate | 1.70 |
| Kelcoloid-LD | 1.5 |
| Flavor | 1.0 |
| Sweetener | 1.2 |
| Water | 36.63 |
| | 100.00 |

Example III

| Ingredient | Percent by weight |
|---|---|
| Sodium citrate | 2.00 |
| Stannous chloride | 0.4 |
| Sodium fluoride | 0.20 |
| Glycerine | 27.57 |
| Lactose | 45.43 |
| Sodium lauryl sulfate | 1.70 |
| Kelcoloid-LD | 1.50 |
| Flavor | 1.00 |
| Sweetener | 0.20 |
| Water | 20.00 |
| | 100.00 |

Example IV

| Ingredient | Percent by weight |
|---|---|
| Sodium citrate | 2.00 |
| Stannous fluoride | 0.4 |
| Glycerine | 27.57 |
| Lactose | 50.00 |
| Kelcoloid-LD | 1.5 |
| Flavor | 1.0 |
| Sweetener | 0.2 |
| Sodium lauryl sulfate | 1.70 |
| Water | 15.63 |
| | 100.00 |

Example V

| Ingredient | Percent by weight |
|---|---|
| Sodium tartronate | 2.00 |
| Stannous fluoride | 0.4 |
| Glycerine | 27.57 |
| Kaopolite-SF (calcined aluminum silicate) | 43.00 |
| Sodium lauryl sulfate | 1.70 |
| Kelcoloid-LD | 1.5 |
| Flavor | 1.0 |
| Sweetener | 0.2 |
| Water | 22.63 |
| | 100.00 |

Example VI

| Ingredient | Percent by weight |
|---|---|
| Stannous fluoride | 0.40 |
| Sodium malate | 0.42 |
| Water | 18.23 |
| Sweetener | 0.15 |
| Lactose | 7.00 |
| Humectant (mixture of glycerin and sorbitol [1:3]) | 22.35 |
| Insoluble-sodium metaphosphate | 48.00 |
| Flavor | 0.85 |
| Sodium alginate | 1.00 |
| Sodium lauryl sulfate | 1.60 |
| | 100.00 |

Example VII

An example of a dentist's topical solution utilizing the present invention is:

| Ingredient | Percent by weight |
|---|---|
| Sodium citrate | 7.00 |
| Stannous fluoride | 2.00 |
| Saccharin | 0.1 |
| Flavor | 0.1 |
| Water | 90.8 |
| | 100.00 |

Example VIII

A typical mouthwash utilizing the discovery is:

| Ingredient | Percent by weight |
|---|---|
| Sodium citrate | 0.3 |
| Stannous fluoride | 0.04 |
| 70% aqueous solution of sorbitol | 10.00 |
| Sodium cyclamate | 0.3 |
| Color | 0.15 |
| Polyoxyethylene sorbitan monostearate (Tween 60) | 0.6 |
| Bactericidal agent | 0.1 |
| Flavor | 0.1 |
| Zinc chloride | 0.1 |
| 95% ethyl alcohol | 20.65 |
| Water | 67.66 |
| | 100.00 |

Example IX

A typical dentifrice powder is:

| Ingredient | Percent by weight |
|---|---|
| Stannous fluoride | 0.5 |
| Kaopolite-SF (calcined aluminum silicate) | 30.00 |
| Flavor | 1.0 |
| Saccahrin | 0.2 |
| Sodium citrate | 2.0 |
| Lactose | 66.3 |
| | 100.00 |

The terms and expressions employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:
1. An aqueous composition to which has been added between about 0.1% and 5% of stannous fluoride and between about 0.05% and 10% of a stabilizer therefor selected from the class consisting of malic acid and the water-soluble salts of citric acid and hydroxyl substituted aliphatic dicarboxylic acids.
2. A dentifrice comprising a substantially calcium ion-free dentifrice vehicle and to which has been added between about 0.1% and 2% by weight of stannous fluoride and from about 0.1% to about 5% by weight of a stabilizing agent selected from the class consisting of malic acid and the water-soluble salts of citric acid and hydroxyl substituted aliphatic dicarboxylic acids.
3. A dentifrice as defined by claim 2 wherein the stabilizing agent is a member selected from the class consisting of water soluble salts of citric, tartaric, malic and tartronic acids.
4. A dentifrice as defined by claim 2 wherein the stabilizing agent is sodium citrate.
5. A dentifrice as defined by claim 2 wherein the stabilizing agent is malic acid.
6. A dentifrice as defined by claim 2 wherein the stabilizing agent is sodium malate.
7. A dentifrice as defined by claim 2 wherein the stabilizing agent is sodium tartronate.
8. A dentifrice as defined by claim 2 wherein the stabilizing agent is a water soluble salt of malic acid.
9. A dentifrice as defined by claim 2 wherein the pH of the dentifrice is between about 3 and 7.
10. A mouthwash composition comprising an aqueous solution to which has been added from about 0.01 to 0.2% by weight of stannous fluoride and from about 0.05% to about 3% by weight of a stabilizing agent selected from the class consisting of citric and malic acid and the water-soluble salts of citric acid and hydroxyl substituted aliphatic dicarboxylic acids.
11. A dental topical solution comprising an aqueous solution to which has been added from about 1% to 5% by weight of stannous fluoride and from about 5% to about 10% by weight of a stabilizing agent selected from the class consisting of malic acid and the water-soluble salts of citric acid and hydroxyl substituted aliphatic dicarboxylic acids.
12. An aqueous composition to which has been added between about 0.1% and 5% of stannous fluoride and between about 0.05% and 10% of a stabilizer therefor selected from the class consisting of water soluble salts of citric and hydroxyl substituted aliphatic dicarboxylic acids.

References Cited by the Examiner

UNITED STATES PATENTS

| | | | |
|---|---|---|---|
| 2,913,373 | 11/1959 | Weisz et al. | 167—93 |
| 3,034,967 | 5/1962 | Apperson et al. | 167—93 |

FOREIGN PATENTS

| | | |
|---|---|---|
| 207,014 | 3/1957 | Australia. |
| 777,556 | 6/1957 | Great Britain. |
| 787,175 | 12/1957 | Great Britain. |
| 804,486 | 11/1958 | Great Britain. |

OTHER REFERENCES

Brudevold et al.: Jour. Amer. Dental Assoc., vol. 53, No. 2, pp. 159–164, August 1956.

Drug and Cosmetic Industry, vol. 67, No. 6, December 1950, p. 833.

Suzuki et al.: Public Notice of Application for a patent 1951–4650, Aug. 20, 1951, Japan (3 pp. spec.).

Webster's New International Dictionary, 2nd ed., page 699, 1940.

LEWIS GOTTS, *Primary Examiner.*

R. HUFF, *Assistant Examiner.*